Figure 1:
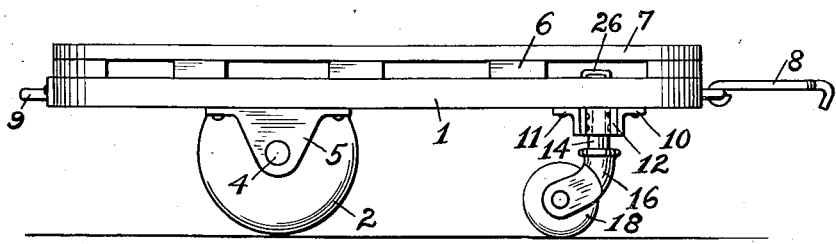

W. E. FERRIS.
TRAILER TRUCK FOR INDUSTRIAL PURPOSES.
APPLICATION FILED JULY 14, 1919.

1,378,445.

Patented May 17, 1921.

Inventor
W. E. Ferris
By
his Attorney

UNITED STATES PATENT OFFICE.

WILLIAM E. FERRIS, OF CLEVELAND, OHIO, ASSIGNOR TO THE OHIO TRAILER COMPANY, A CORPORATION OF OHIO.

TRAILER-TRUCK FOR INDUSTRIAL PURPOSES.

1,378,445.  Specification of Letters Patent.  Patented May 17, 1921.

Application filed July 14, 1919. Serial No. 310,620.

*To all whom it may concern:*

Be it known that I, WILLIAM E. FERRIS, a citizen of the United States, residing at Cleveland, in the county of Cuyahoga and State of Ohio, have invented certain new and useful Improvements in Trailer-Trucks for Industrial Purposes, of which the following is a specification.

This invention relates to trailer trucks and more particularly to trailer trucks adapted to be drawn by motors for factory and railroad purposes and having forward pivoted casters for steering the same.

The principal object of the invention is to provide said industrial trailer trucks of such construction that, said forward pivoted casters will at all times travel upon the floor although uneven and the trailer trucks are traveling at a high rate of speed.

It has been a difficult matter to keep the four wheels of an industrial trailer truck and especially the forward pivoted steering casters thereof upon the floor due to unevenness of the floor and also high speed, and unless said wheels and especially said casters remain upon the floor, the trailer truck will not follow the tracks of the pulling motor. By means of this invention, the forward pivoted steering casters are caused to remain upon the floor, and the trailer trucks will follow the pulling motor, and each other when coupled in a train, with but slight swerving from side to side.

In the drawings, similar characters of reference are used to designate corresponding parts.

Figure 2:
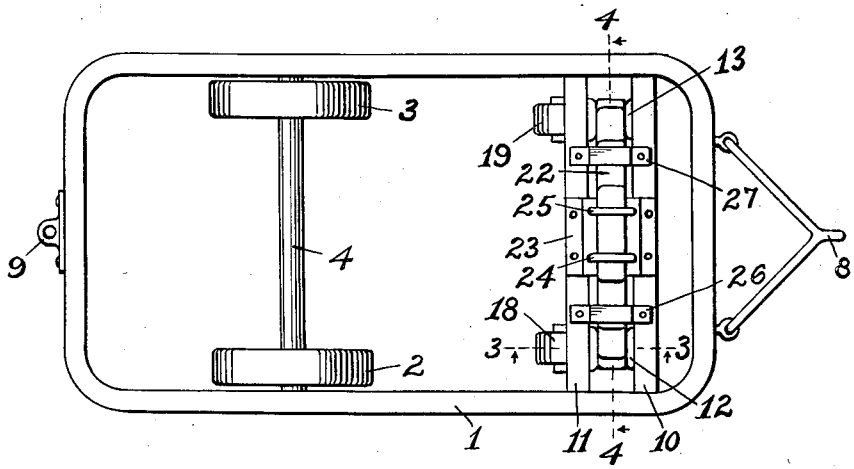
Figure 3:
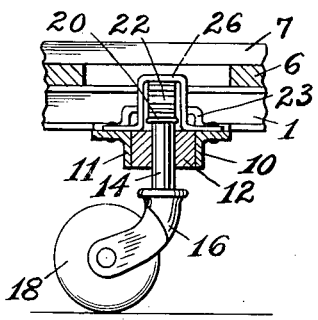
Figure 4:
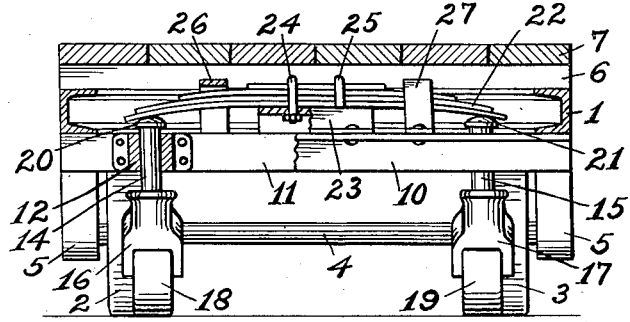

Figure 1 is a side elevation of an industrial trailer truck constructed in accordance with my invention, Fig. 2 is a plan view of the same, the cross pieces and the floor being omitted, Fig. 3 is a sectional view on an enlarged scale, taken on line 3—3 of Fig. 2, and, Fig. 4 is a cross sectional view on the same scale, taken on line 4—4 of Fig. 2.

Referring to the drawings, 1 represents the frame of an industrial trailer truck, which is supported by a pair of rear wheels 2 and 3 carried by an axle 4, and said axle is rotatably mounted in bracket bearings fixed to said frame and indicated by 5. Cross pieces 6 are fastened to the frame 1, and floor boards 7 extending longitudinally thereof are fixed to the cross pieces. Any suitable means as 8 may be used to connect the trailer truck to a motor vehicle or to engage a member 9 at the rear end of the preceeding trailer truck when the same are coupled in a train.

The forward end of the trailer truck is usually supported by pivoted casters to allow for steering in turning, and the manner of mounting said casters so as to always remain upon the floor and thus track the pulling motor thereby preventing swerving of the trailer truck, will now be described.

To the underside of the frame 1 are fixed a pair of spaced angle irons 10 and 11, between and to which are fixed blocks 12 and 13, having vertical openings therethrough for receiving the loosely mounted shanks 14 and 15 of caster frames 16 and 17, to which are pivoted rollers 18 and 19 respectively. The shanks 14 and 15 are longer than the height of the blocks 12 and 13 to allow for vertical movement as well as rotary movement, and said shanks terminate in heads 20 and 21 having convex tops, which are engaged by the downwardly turned free ends of a leaf spring 22. Said leaf spring is secured at its center to an inverted channel plate 23, which is fixed to the angle irons 10 and 11, by means of U bolts 24 and 25. When the trailer truck is loaded, the weight tends to force the frame 1 downwardly and the free ends of the leaf spring 22 are forced upwardly. For limiting the upward movement of the leaf spring, straps 26 and 27, which are fixed to the angle irons 10 and 11, are employed.

By supporting the forward pivoted casters of an industrial trailer truck as shown and described, the weight of the frame or the frame and the load is resiliently supported by the leaf spring upon the shanks of the casters, and when traveling over an uneven floor, the casters will be forced downwardly into a depression or may rise in passing over an elevation, and therefore always remain in contact with the floor thus tending to prevent the trailer truck swerving from side to side as is the result when the trailer truck is supported on but three instead of four wheels.

Having fully described my invention, what I claim is:

1. In a trailer truck, the combination of a frame, wheels and casters for supporting the frame, the casters being rotatably and slidably mounted in the frame in pairs, and spring means fixed to the frame for supporting the frame upon said pairs of casters, substantially as described.

2. In a trailer truck, the combination of a frame, wheels and casters arranged in pairs for supporting the frame, the casters being rotatably and slidably mounted in the frame, and a flat spring fixed to the frame and supporting the frame upon said pairs of casters, substantially as described.

3. In a trailer truck, the combination of a frame, wheels and casters arranged in pairs for supporting the frame, the casters being rotatably and slidably mounted in the frame, a leaf spring, the leaf spring being fixed to the frame, and having a pair of free ends, and the free ends of the leaf spring supporting the frame upon said pairs of casters, substantially as described.

4. In a trailer truck, the combination of a frame, wheels and casters for supporting the frame, the casters being rotatably and slidably mounted in the frame, a leaf spring, the leaf spring being fixed at its center to the frame and having a pair of free ends, the free ends of the leaf spring supporting the frame upon said casters, and means for limiting the upward movement of the free ends of said leaf spring, substantially as described.

5. In a trailer truck, the combination of a frame, wheels and casters for supporting the frame, the casters having shanks, the shanks of the casters being loosely mounted in the frame to permit rotation and vertical movement thereof, a leaf spring fixed at its center to the frame and having downwardly curved free ends, and the free ends of the leaf spring resting upon said shanks of the casters, substantially as described.

In testimony whereof I affix my signature.

WILLIAM E. FERRIS.